(12) United States Patent
Pipher et al.

(10) Patent No.: US 11,336,707 B1
(45) Date of Patent: May 17, 2022

(54) ADAPTIVE CONTENT TRANSMISSION

(71) Applicant: T-MOBILE USA, INC., Bellevue, WA (US)

(72) Inventors: Nicholas Pipher, Parker, CO (US); Wilfred I. Tucker, Centennial, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/129,021

(22) Filed: Dec. 21, 2020

(51) Int. Cl.
*H04L 65/60* (2022.01)
*G06F 3/16* (2006.01)

(52) U.S. Cl.
CPC ............ *H04L 65/601* (2013.01); *G06F 3/165* (2013.01)

(58) Field of Classification Search
CPC .............................. H04L 65/601; G06F 3/165
USPC .......................................................... 709/217
See application file for complete search history.

(56) References Cited

U.S. PATENT DOCUMENTS

| | | | | |
|---|---|---|---|---|
| 7,284,201 | B2 | 10/2007 | Cohen-Solal | |
| 10,425,687 | B1 * | 9/2019 | Karnezos | ......... H04N 21/42204 |
| 10,657,968 | B1 * | 5/2020 | Raman | .................... G16H 50/30 |
| 10,841,651 | B1 * | 11/2020 | Karnezos | ........... H04N 21/4223 |
| 11,025,892 | B1 * | 6/2021 | Aman | ..................... A63F 13/69 |
| 2013/0195204 | A1 | 8/2013 | Reznik et al. | |
| 2018/0288120 | A1 | 10/2018 | Dorwin | |
| 2019/0343382 | A1 * | 11/2019 | Rubner | ................. G06F 3/0481 |
| 2019/0347181 | A1 * | 11/2019 | Cranfill | ................... G06F 9/541 |
| 2019/0369748 | A1 * | 12/2019 | Hindi | ..................... G06F 3/0346 |
| 2020/0142667 | A1 * | 5/2020 | Querze | .................... G06F 3/012 |
| 2020/0326824 | A1 * | 10/2020 | Alonso | ................. G06F 3/0486 |
| 2020/0341610 | A1 * | 10/2020 | Quintana | ............ G06F 3/04855 |
| 2020/0405212 | A1 * | 12/2020 | Chappell, III | .......... A61B 5/316 |
| 2020/0409537 | A1 * | 12/2020 | Story | .................... H04L 67/306 |
| 2020/0413138 | A1 * | 12/2020 | Graf | ............... H04N 21/234363 |
| 2021/0019108 | A1 * | 1/2021 | Smith | ................... H04R 1/1041 |
| 2021/0099505 | A1 * | 4/2021 | Ravine | ................ H04L 12/1822 |
| 2021/0109585 | A1 * | 4/2021 | Fleming | ............. G06K 9/00221 |
| 2021/0133670 | A1 * | 5/2021 | Cella | ........................ G06N 20/20 |
| 2021/0337269 | A1 * | 10/2021 | Barnum | ................ G06F 16/483 |
| 2021/0385533 | A1 * | 12/2021 | Daly | ................ H04N 21/42202 |

\* cited by examiner

*Primary Examiner* — Melvin H Pollack
(74) *Attorney, Agent, or Firm* — Marshall, Gerstein & Borun LLP

(57) ABSTRACT

Techniques for adjusting the streaming of content by a media player device based on a user's location, orientation, or attention relative to the media player device are provided. Such techniques may include, while streaming media content to a media player device, modifying one or more characteristics of the streaming media content based on an indication of user attention levels. The indication of user attention levels may be determined by receiving a signal from a personal computing device associated with a user, and using such signal to determine an indication of the attention of the user to the media player device (e.g., based upon the user's proximity or orientation relative to the media player device). Modifying the characteristics of the streaming media may include adjusting the quality of the streaming media content to reduce data transfer when the user is not paying attention to the media player device.

20 Claims, 5 Drawing Sheets

ADAPTIVE CONTENT TRANSMISSION

FIELD OF THE DISCLOSURE

The present disclosure generally relates to techniques for adjusting the streaming of content by a media player device based on a user's location, orientation, or attention relative to the media player device.

BACKGROUND

Users have come to expect a large variety of content that is immediately accessible across any variety of devices by streaming or downloading such content via a network connection. However, that content can be consumed in a variety of ways, and the transmission of content to a user's devices may incur costs for the user or may reduce available network resources for transmitting other content to the same or different users. As the quality of the content (which generally corresponds to bitrate) increases, so too does the cost or resource utilization of content delivery. Further, many users default to the highest-quality content, even in situations where the content bitrate could be lowered without impacting a user's experience. Thus, many users are unintentionally incurring unnecessary charges and detrimentally impacting network performance.

SUMMARY

Techniques for detecting a user's location, motion, and/or orientation relative to a media player device and changing various aspects of a content delivery stream accordingly are provided herein. Generally, the techniques described herein involve determining whether high-bandwidth content is necessary for a user's enjoyment, given the location, orientation, and/or attention of the user. For instance, if the user's activities indicate that degraded content would likely not be noticed by the user, then lower-bitrate content may be provided. The user's location, motion, and/or orientation relative to the content playback device may be determined based on the location, motion and/or orientation of a personal computing device (such as a smart phone, tablet, smart watch, fitness tracker, smart headphones or other headset, laptop, etc.) associated with the user relative to the media player device (such as another smart phone or tablet, a smart speaker or digital assistant device, a TV, a computer, a monitor, etc.). The bitrate, content source, version of content, and the like may be adjusted to account for the user's interaction with the content. This may reduce the costs (to both the user and to the provider) of content delivery to the user, while maintaining the user's experience and freeing network resources for use by other users.

As one example, when a user is watching a movie streamed to the user's television, if the user turns away from the television (e.g., changes orientation) or moves to another room in which the television is not visible (e.g., changes location), then the system may determine that video outputted by the television cannot be seen by the user. In such a case, audio content may be streamed while video content is not, or video content may be transitioned to a lower-quality stream. When the system determines that the user is approaching the television or is paying attention to the television, video streaming may be re-enabled, and/or transitioned to a higher-quality stream.

As another example, audio quality may be degraded as a listener moves further from a streaming audio source. This degradation may not be perceptible to the user as the distance between the audio source and the user lowers the perceived "maximum fidelity" of the audio. Again, this may result in a savings (to both the user and to the provider) in transmission cost and reduces network congestion.

Moreover, as another example, the quality or bitrate of the stream from a media player device may be adjusted based on the user's use of his or her personal computing device. For instance, a user who is actively browsing the internet or working on a document via his or her personal computing device while a movie or TV show is streamed by a media player device may not be paying full attention to the content streaming via the media player device, and thus, the bitrate (or otherwise quality) of the content streaming via the media player device may be lowered.

As yet another example, the system may determine a maximum resolution at which a media player device can output content, whether audible or visual. Bandwidth dedicated to content transmission may be downshifted and lower-quality content transmitted to match the maximum output resolution, even if the content stream requested has a higher bandwidth. This may be useful, for example, when a user begins enjoying content on a first, high-resolution media player device but switches the content stream to a second, low-resolution media player device.

Adjusting streaming based on a user's activities may also be used to provide features for "rewinding" the content to where it was when the user returns from having been inattentive, not physically present, or facing away from the content for any period of time, or for pausing the content while the user is inattentive, not physically present, or facing away from the content. If content is paused or rewound, the playback speed can be accelerated to allow the user to catch up to real time (e.g., when the user is watching live content, such as a sporting event).

In an aspect, a method is provided, the method comprising: streaming media content by a media player device; receiving, by the media player device, a signal from a personal computing device associated with a user; determining, by the media player device, an indication of the attention of the user to the media player device based on the signal from the personal computing device associated with the user; and modifying, by the media player device, one or more characteristics of the streaming of the media content based on the indication of the attention of the user associated with the personal computing device.

In another aspect, a media player device is provided, the media player device comprising: one or more of an audio output or a video output; one or more processors; and a non-transitory program memory communicatively coupled to the one or more processors and storing executable instructions that, when executed by the one or more processors, cause the processors to: stream media content via one or more of the audio output or the video output; receive a signal from a personal computing device associated with a user; determine an indication of the attention of the user to the media player device based on the signal from the personal computing device associated with the user; and modify one or more characteristics of the streaming of the media content based on the indication of the attention of the user associated with the personal computing device.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
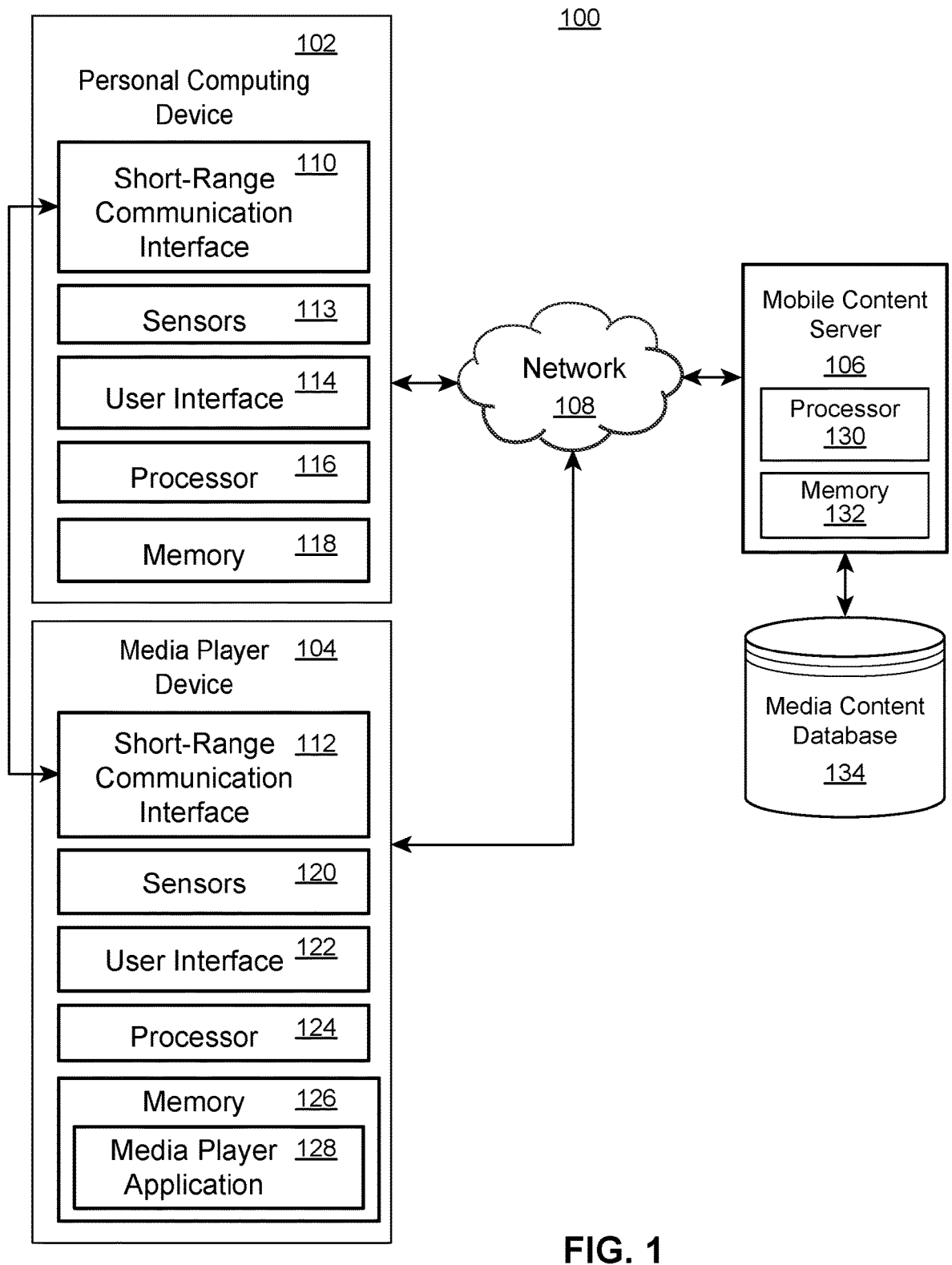
FIG. 1 illustrates block diagram of an example system for adjusting the streaming of content by a media player device based on a user's location, orientation, and/or attention relative to the media player device, in accordance with some embodiments.

FIG. 1 illustrates block diagram of an example system 100 for adjusting the streaming of content by a media player device based on a user's location, orientation, or attention relative to the media player device, in accordance with some embodiments. The high-level architecture illustrated in FIG. 1 may include both hardware and software applications, as well as various data communications channels for communicating data between the various hardware and software components, as is described below.

The system 100 may include a personal computing device 102, and a media player device 104 configured to stream media content from a media content server 106, e.g., via a network 108. The personal computing device 102 and the media player device 104 may be configured to communicate with one another e.g., via short-range communication interfaces 110, 112 associated with the personal computing device 102 and the media player device 104, respectively, and/or via the network 108.

Generally speaking, the personal computing device 102 may be e.g., a smart phone, a tablet, a laptop computer, a smart watch, a fitness tracker, a smart headset or smart headphones, etc., associated with a particular user. In some examples, the system 100 may include multiple such personal computing devices 102. The (or each) personal computing device 102 may include a short-range communication interface 110, sensors 113, and/or a user interface 114. Furthermore, the personal computing device 102 may include one or more processors 116 and a memory 118 (e.g., volatile memory, non-volatile memory) accessible by the one or more processors 116 (e.g., via a memory controller).

The short-range communication interface 110 of the personal computing device 102 may include transmitters, receivers, transceivers, etc., and may be configured to send and/or receive short-range wireless communication signals (e.g., Bluetooth® signals, Zigbee® signals, infrared signals, etc.) to and from the short-range communication interface 112 of the media player device 104. The sensors 113 may include motion sensors such as gyroscopes, accelerometers, and/or GPS sensors configured to detect the motion, orientation, direction, location, etc. of the personal computing device 102. Additionally, in some examples, the sensors 113 may include orientation sensors, such as a compass configured to determine a direction in which that the personal computing device 102 is facing, pointing, and/or traveling. The user interface 114 may be configured to present information, such as various alerts or notifications, to the user of the personal computing device 102. Furthermore, in some examples, the user interface 114 may be configured to receive inputs and/or selections from the user of the personal computing device 102.

The one or more processors 116 may interact with the memory 118 to obtain, for example, computer-readable instructions stored in the memory 118. The computer-readable instructions stored in the memory 118 may cause the one or more processors 116 to execute one or more applications, some of which may involve receiving user input via the user interface 114. Additionally, the computer-readable instructions stored in the memory 118 may cause the one or more processors 116 to send signals, e.g., via the short-range communication interface 110, to the media player device 104. In some examples, these signals may be periodic "beacon" signals. Moreover, in some examples, these signals may include indications of data captured by the sensors 113 indicating the motion, orientation, direction, location, etc. of the personal computing device 102. Furthermore, in some examples, these signals may include indications of the user's use of the personal computing device 102, e.g., including indications of the timing or frequency of inputs and/or selections received by the user interface 114, and indications of any applications currently in use by the user of the personal computing device. Additionally, in some examples, the computer-readable instructions stored in the memory 118 may cause the one or more processors 116 to analyze data captured by the sensors 113 and indications of the user's use of the personal computing device 102 to determine an indication of the user's attention to the media player device 104, and send signals to the media player device 104 indicating the determined indication of the user's attention to the media player device. Furthermore, the computer-readable instructions stored on the memory 118 may include instructions for carrying out any of the steps of the method 300, described in greater detail below with respect to FIG. 3.

Generally speaking, the media player device 104 may be a TV and/or a set top box associated with a TV, a digital assistant device, a smart speaker, a smart phone or tablet, a computer or monitor, and/or any other device suitable for streaming media content, such as audio content, visual content, or combined audio and visual content. The media player device 104 may include a short-range communication interface 112, sensors 120, and/or a user interface 122. Furthermore, the media player device 104 may include one or more processors 124 and a memory 126 (e.g., volatile memory, non-volatile memory) accessible by the one or more processors 124 (e.g., via a memory controller).

The short-range communication interface 112 of the media player device 104 may include transmitters, receivers, transceivers, etc., and may be configured to send and/or receive short-range wireless communication signals (e.g., Bluetooth® signals, Zigbee® signals, infrared signals, etc.) to and from the short-range communication interface 110 of the personal computing device 102. The sensors 120 may include motion sensors such as gyroscopes, accelerometers, and/or GPS sensors configured to detect the motion, orientation, direction, location, etc. of the media player device 104. Furthermore, in some examples, the sensors 120 may include motion sensors configured to detect the motion of people (e.g., a user associated with the personal computing device 102) or objects near the media player device 104. For instance, these motion sensors may include an infrared camera configured to detect when individuals move toward or away from the media player device 104, and/or a camera configured to detect whether an individual near the media player device 104 is facing the media player device 104 or whether the individual's back is turned with respect to the media player device 104. Additionally, in some examples, the sensors 120 may include orientation sensors, such as a compass configured to determine a direction in which the media player device 104 is facing, pointing, and/or moving. The user interface 122 may be configured to present media content (e.g., via a display screen, via a speaker, or via any other audio and/or visual output), and/or present information, such as various alerts or notifications. Furthermore, in some examples, the user interface 122 may be configured to receive inputs and/or selections from a user of the media player device 104.

The one or more processors 124 may interact with the memory 126 to obtain, for example, computer-readable instructions stored in the memory 126. The computer-readable instructions stored in the memory 126 may cause the one or more processors 124 to execute a media player application 128. Executing the media player application 128 may include receiving media content from the media content server 106, streaming the media content (e.g., via the user interface 122), receiving a signal from the personal computing device 102, determining an indication of the attention of the user of the personal computing device 102 to the media player device 104 based on the signal (or receiving an indication of the attention of the user of the personal computing device 102 to the media player device 104 via the signal), and/or modifying one or more characteristics of the streaming of the media content based on the indication of the attention of the user of the personal computing device 102. Furthermore, the computer-readable instructions stored on the memory 126 may include instructions for carrying out any of the steps of the method 300, described in greater detail below with respect to FIG. 3.

The media content server 106 may include one or more processors 130 and a memory 132 (e.g., volatile memory, non-volatile memory) accessible by the one or more processors 130 (e.g., via a memory controller). The one or more processors 130 may interact with each memory 132 to obtain, for example, computer-readable instructions stored in the memory 132. The computer-readable instructions stored in the memory 132 may cause the one or more processors 130 to access media content stored on the memory 132 and/or media content stored in a media content database 134 and send the media content to the media player device 104 for streaming. In particular, the computer-readable instructions stored on the memory 132 may include instructions for carrying out any of the steps of method 300, described in greater detail below with respect to FIG. 3. The media content database 134 may be accessed by or incorporated within the media content server 106, in various embodiments.

Figure 2A:
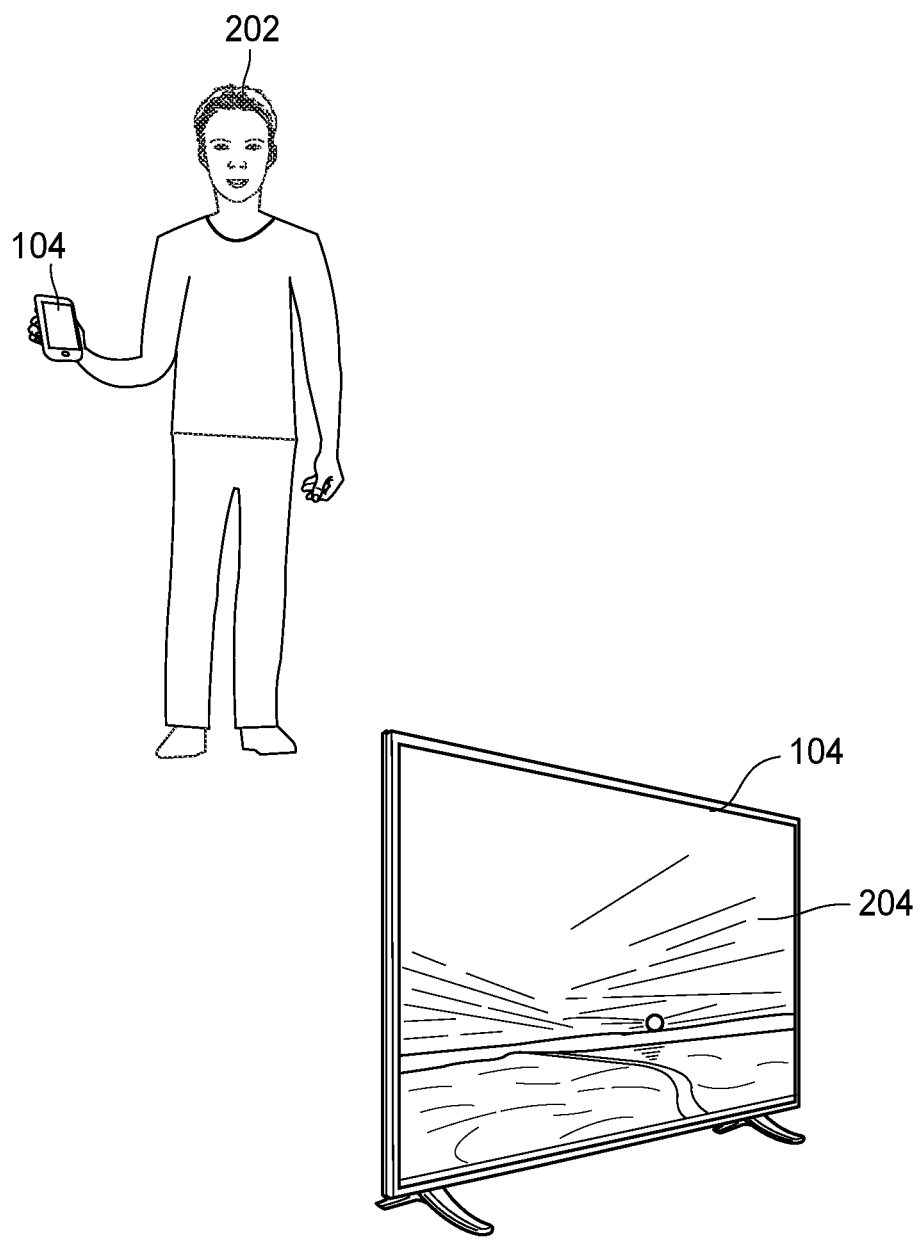
FIGS. 2A-2C illustrate several examples of various users' locations, orientations, and/or attentions relative to a media player device, in accordance with some embodiments.
Figure 2B:
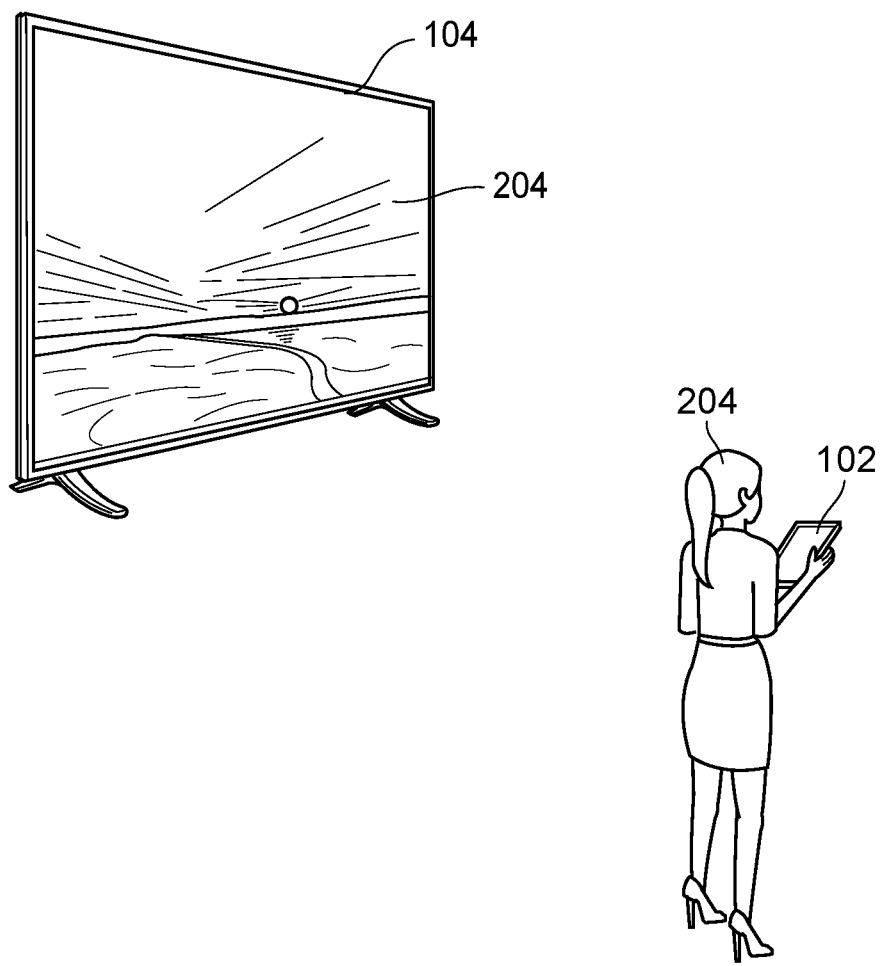
Figure 2C:
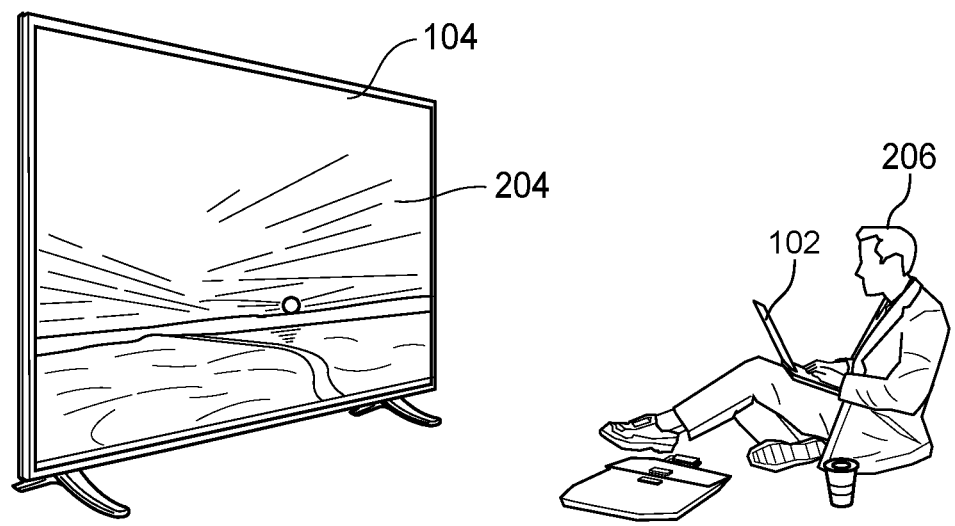

FIGS. 2A-2C illustrate several examples of various users' locations, orientations, and/or attentions relative to a media player device, in accordance with some embodiments. FIG. 2A illustrates a user 202 of a personal computing device 102 located behind a display screen 204 of a media player device 104. Because the user 202 is located behind the display screen 204 of the media player device 104, the user 202 is unlikely to be paying full attention to any media content being streamed by the media player device 104.

FIG. 2B illustrates a user 204 who is located in front of the display screen 204 of the media player device 104 but oriented away from the display screen 204 of the media player device 104. Although the user 204 is located in front of the display screen 204 of the media player device 104, the user 204 is unlikely to be paying full attention to any media content being streamed by the media player device 104 because her face and body are oriented away from the display screen 204 of the media player device 104.

FIG. 2C illustrates a user 206 of a personal computing device 102 who is oriented toward the display screen 204 of the media player device 104, but who is actively engaging with applications of his personal computing device 102 (e.g., working on a document or browsing the internet). Although the user 206 is located in front of the display screen 204 of the media player device 104 and oriented toward the display screen 204 of the media player device 104, the user 206 is unlikely to be paying full attention to any media content being streamed by the media player device 104 because he is actively working on a document or browsing the internet via his personal computing device 102.

Figure 3:
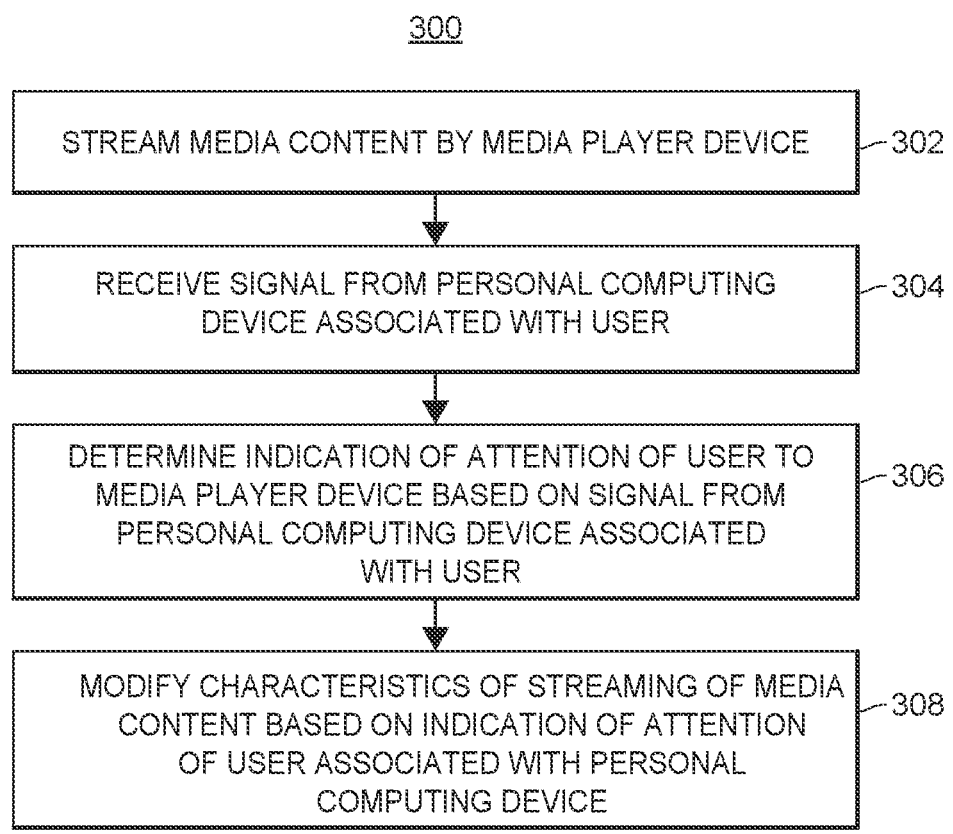
FIG. 3 illustrates a flow diagram of an example method for adjusting the streaming of content by a media player device based on a user's location, orientation, and/or attention relative to the media player device, in accordance with some embodiments.

FIG. 3 illustrates a flow diagram of an example method 300 for adjusting the streaming of content by a media player device based on a user's location, orientation, or attention relative to the media player device, in accordance with some embodiments. One or more steps of the method 300 may be implemented as a set of instructions stored on a computer-readable memory (e.g., memories, 118, 126, or 132) and executable on one or more processors (e.g., processors 116, 124, or 130).

At block 302, media content may be streamed by a media player device. For instance, the media content may include audio content and/or video content, such as a music stream, a podcast stream, a television stream, a movie stream, etc.

At block 304, a signal may be received from a personal computing device associated with a user. For instance, in some examples, the media player device may receive the signal directly from the personal computing device via a short-range wireless communication signal, such as e.g., a Bluetooth® signal, a Zigbee® signal, an infrared signal, etc. Moreover, in some examples, the media player device may receive the signal from the personal computing device via a wireless network (e.g., a WiFi network).

At block 306, a determination of an indication of the attention of the user to a media player device may be made based on the signal from the personal computing device associated with the user. In some examples, the processing of determining the indication of the attention of the user to the media player device may be done by a processor of the personal computing device, and the result of the determination may be communicated via the signal. In other examples, the processing of determining the indication of the attention of the user to the media player device may be done by a processor of the media player device based on information communicated via the signal.

In some examples, determining the indication of the attention of the user to the media player device based on the signal from the personal computing device associated with the user may include determining a distance between the personal computing device and the media player device based on the signal from the personal computing device (e.g., based on the strength of the signal), and determining the indication of the attention of the user to the media player device based at least in part on the distance between the personal computing device and the media player device. For example, when the personal computing device is further from the media player device, the user may be further from the media player device, indicating that the user may be paying less attention to the media player device, and when the personal computing device is close to the media player device, the user may be closer to the media player device, indicating that the user may be paying more attention to the media player device.

In some examples, determining the indication of the attention of the user to the media player device based on the distance between the personal computing device and the media player device may include determining whether the distance between the personal computing device and the media player device exceeds a threshold distance. For instance, when the distance between the personal computing device and the media player device exceeds the threshold distance, the user may be unlikely to be paying attention to the media player device, but when the distance between the personal computing device and the media player device does not exceed the threshold distance, the user may be likely to be paying attention to the media player device. In some examples, there may be multiple such threshold distances— for instance, when the distance between the personal computing device and the media player device exceeds a first threshold distance, the user of the personal computing device may be unlikely to be in the same residence or area as the media player device and thus may be extremely unlikely to be paying attention to the media player device. When the distance between the personal computing device and the media player device exceeds a second threshold distance but not the first threshold distance, the user of the personal computing device may be unlikely to be in the same room as the media player device, and may be more likely to not be paying attention to the media player device, or to be paying partial attention to the media player device (e.g., listening but not watching, listening and occasionally watching but not continuously watching, etc.). When the distance between the personal computing device and the media player device does not exceed the second threshold distance, the user of the personal computing device may likely be the same room as the media player device, and thus may be more likely to be paying full attention to the media player device (e.g., listening and watching, listening closely, watching closely, etc.).

In some examples, determining the indication of the attention of the user to the media player device based on the signal from the personal computing device associated with the user may include determining a location of the personal computing device with respect to the media player device based on the signal from the personal computing device (e.g., based on GPS or other coordinates communicated via the signal, based on the direction from which the signal is received and/or the strength of the signal, etc.), and determining the indication of the attention of the user to the media player device based at least in part on the location of the personal computing device with respect to the media player device.

For instance, in some examples, determining the location of the personal computing device may include determining an extent to which the personal computing device is in front of a display portion (e.g., a screen) of the media player device, behind the display portion of the media player device, or adjacent to the display portion of the media player device. For example, if the personal computing device is located in front of the display portion of the media player device (e.g., as shown in FIGS. 2B and 2C), the user of the personal computing device may be more likely to be paying full attention to the media player device. In contrast, if the personal computing device is located adjacent to the display portion of the media player device, the user of the personal computing device may be more likely to be paying only partial attention to the media player device, and if the personal computing device is located behind the display portion of the media player device (e.g., as shown in FIG. 2A), the user of the personal computing device may be unlikely to be paying attention to the media player device.

Moreover, in some examples, determining the location of the personal computing device may include determining an extent to which the personal computing device is above or below the media player device. If the personal computing device is at the same level as the media player device, or within a threshold elevation below or above the media player device, the user of the personal computing device may be more likely to be at the same level of a home or other building as the media player device, and thus may be more likely to be paying attention to the media player device. In contrast, if the personal computing device is more significantly above or below the media player device (e.g., outside of a threshold elevation below or above the media player device), the user of the personal computing device may be more likely to be at a different level of a home or other building as the media player device (e.g., in a basement or upstairs of a home where the media player device is located on the main level, in a different level of an apartment building, etc.), and may be less likely to be paying attention to the media player device. Additionally, in some examples, determining the location of the personal computing device may include determining whether the personal computing device is in the same room as the media player device. In some examples, this may be detected based on interference with the signal (e.g., due to walls). When the personal computing device is not within the same room as the media player device, the user of the personal computing device may be unlikely to be paying attention to the media player device, while when the personal computing device is in the same room as the media player device, the user of the personal computing device may be more likely to be paying attention to the media player device.

Furthermore, in some examples, determining the indication of the attention of the user to the media player device based on the signal from the personal computing device associated with the user may include determining an orientation of the personal computing device with respect to the media player device based on the signal from the personal computing device, and determining the indication of the attention of the user to the media player device based at least in part on the orientation of the personal computing device with respect to the media player device. For instance, in some examples, an indication of the orientation of the personal computing device may be determined by the media player device based at least in part on the signal received from the personal computing device (e.g., based on signal strength, direction, etc.). Furthermore, in some examples, an indication of the orientation of the personal computing device may be determined by the personal computing device, e.g., based on sensors, such as accelerometers, gyroscopes, compasses, etc. of the personal computing device, and this determined indication of the orientation of the personal computing device may be communicated to the media player device via the signal from the personal computing device. Additionally, in some example, an indication of the orientation of the personal computing device and an indication of the orientation of the media player device may both be determined and compared to one another to determine an orientation of the personal computing device with respect to the media player device. In some examples, the orientation of the personal computing device may indicate a certain orientation of the head or body of the user. For instance, when the personal computing device is a set of headphones or a headset, the orientation of the headphones or headset may indicate the orientation of the user's head, i.e., indicating a direction that the user's head is facing. Similarly, when the personal computing device is a smart watch or fitness tracker, the orientation of smart watch or fitness tracker may indicate the direction that the user's arms or body are facing. As another example, when the personal computing device is a smart phone, tablet, or laptop, an orientation of the screen may indicate a direction that the user is facing. That is, the screen of a smart phone, tablet, or laptop is likely to be opposite a user's face so that the user can view information displayed via the screen. When the head and/or body of the user of the personal computing device is oriented toward the media player device (or toward a display portion of the media player device, such as a screen), e.g., as shown in FIG. 2C, the user may be more likely to be paying attention to the media player device. When the head and/or body of the personal computing device is oriented partially away from the media player device (or partially away from the display portion of the media player device), e.g., as shown in FIG. 2B, the user may be paying only partial attention to the media player device. Moreover, when the head and/or body of the user of the personal computing device is oriented away from the media player device, the user may not be paying attention to the media player device.

Additionally, in some examples, determining the indication of the attention of the user to the media player device based on the signal from the personal computing device associated with the user may include determining an indication of the user's engagement with one or more applications of the personal computing device, and determining the indication of the attention of the user to the media player device based on the user's engagement with the one or more applications of the personal computing device. For instance, if a user is actively using one or more applications of the personal computing device (e.g., working on a document, playing a game, browsing the internet, using a social media application, watching or listening to content via the personal computing device, placing a phone call or sending text messages using the personal computing device, etc.), as shown in FIG. 2C, the user may not be paying attention, or may be only paying partial attention to the media player device. In contrast, if the user is not actively using any applications of the personal computing device, the user may be paying attention to the media player device (i.e., rather than the personal computing device).

Furthermore, in some examples, determining the indication of the attention of the user to the media player device may be based on the motion of the personal computing device with respect to the media player device, i.e., as detected by motion sensors of the the personal computing device itself or by motion sensors of the media player device. For instance, when the detected motion of the personal computing device indicates that the personal computing device is moving toward the media player device (or turning toward the media player device), the user may be likely to be paying attention to the media player device, while when the detected motion of the personal computing device indicates that the personal computing device is moving away from the media player device (or turning toward the media player device), the user may be unlikely to be paying attention to the media player device.

In some examples, determining the indication of the attention of the user to the media player device may be based on a combination of the methods discussed above. Moreover, in some examples, determining the indication of the attention of the user to the media player device may be based on weighting the methods discussed above. For instance, in some examples, the distance of the personal computing device with respect to the media player device may be weighted more heavily than the orientation of the personal computing device with respect to the media player device or the user's engagement with applications of the personal computing device (i.e., because when the user of the personal computing device is far away from the media player device, they are unlikely to be paying attention to the media player device even when oriented toward the media player device and/or not actively using any applications of the personal computing device).

Additionally, in some examples, indications that the user is unlikely to be paying attention to the media player device may be weighted more heavily than indications that the user is likely to be paying attention to the media player device. For instance, as shown in FIG. 2B, although the user is located in front of the media player device (i.e., indicating that the user is likely paying attention to the media player device), the user is also orientated away from the media player device (i.e., indicating that the user is unlikely to be paying attention to the media player device). Accordingly, in some examples, the indication that the user shown in FIG. 2B is unlikely to be paying attention to the media player device may be weighted more heavily than the indication that the user is likely to be paying attention to the media player device, and the user shown in FIG. 2B may be considered not to be paying attention to the media player device (or not to be paying full attention to the media player device). Similarly, as shown in FIG. 2C, although the user is located in front of the media player device (i.e., indicating that the user is likely paying attention to the media player device), and is oriented toward the media player device (i.e., indicating that the user is likely paying attention to the media player device), the user is also actively engaged in applications of his personal computing device (i.e., indicating that the user is unlikely to be paying attention to the media player device). Accordingly, in some examples, the indication that the user shown in FIG. 2C is unlikely to be paying attention to the media player device may be weighted more heavily than the indications that the user is likely to be paying attention to the media player device, and the user shown in FIG. 2C may be considered not to be paying attention to the media player device (or not to be paying full attention to the media player device).

Furthermore, when there are multiple personal computing devices (e.g., multiple devices associated with multiple users) sending such signals to the media player device, determining the indication of the attention of the user(s) to the media player device may be based on weighting any users determined to be likely to be paying attention to the media player device over any users determined to be less likely to be paying attention to the media player device. That is, if even one user is likely to be paying attention to the media player device (even if other users are not likely to be paying attention to the media player device), the method 300 may proceed based on the user who is likely to be paying attention to the media player device. However, if no users are likely to be paying attention to the media player device, the method 300 may proceed based on the fact that users are not paying attention to the media player device.

At block 308, one or more characteristics of the streaming of the media content by the media player device may be modified based on the indication of the attention of the user associated with the personal computing device. For instance, in some examples, modifying the one or more characteristics of the streaming of the media content may include modifying the quality (e.g., bitrate, bandwidth, frequency range, refresh period, fidelity, resolution, chromatic properties, etc.) of audio and/or visual components of the media content. For example, the quality of the media content may be reduced or downgraded based on an indication that the user is less likely to be paying attention to the media player device, or may be increased or upgraded based on an indication that the user is more likely to be paying attention to the media player device.

Additionally, in some examples, modifying the one or more characteristics of the streaming of the media content may include switching from a combined audio and video stream to an audio-only stream based on the indication of the attention of the user associated with the personal computing device. For example, when the user is less likely to be paying attention to the media player device, the media content may be switched to an audio-only stream, while if the user is more likely to be paying attention to the media player device, the media content may be switched to a combination audio/visual stream.

Furthermore, in some examples, modifying the one or more characteristics of the streaming of the media content may include pausing the streaming of the media content based on the indication of the attention of the user associated with the personal computing device. For instance, when the user is less likely to be paying attention to the media player device, the media content may be paused, while if the user is more likely to be paying attention to the media player device the media content may be played. Similarly, in some examples, if the user is determined to likely be paying less attention to the media player device at a first time, but then is determined to likely be paying more attention to the media player device at a second time, the media content may be "rewound" to a point in the stream that was playing at the first time (i.e., when the user stopped paying full attention to the media player device).

In some examples, the method 300 may include sending a request for confirmation that the characteristics of the stream of the media content can be modified to the personal computing device, and/or receiving a confirmation that the characteristics of the stream of the media content can be modified from the personal computing device, or sending an indication that the characteristics of the media content may be modified to the personal computing device. For instance, based on such a request for confirmation, the personal computing device may display a notification via a user interface display of the personal computing device, and/or may receive an indication of confirmation from the user via the user interface display of the personal computing device.

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, unless indicated otherwise, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may likewise be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, in some embodiments, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "in some embodiments" in various places in the specification are not necessarily all referring to the same embodiment or embodiments.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the description. This description, and the claims that follow, should be read to include one or at least one, and the singular also includes the plural unless the context clearly indicates otherwise.

Upon reading this disclosure, those of skill in the art will appreciate still additional alternative structural and functional designs for adjusting the streaming of content by a media player device based on a user's location, orientation, or attention relative to the media player device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A method of adjusting streaming media based on user attentiveness, comprising:
   streaming media content by a media player device;
   receiving, by the media player device, a signal from a personal computing device associated with a user;
   determining, by the media player device, an indication of attention of the user to the media player device based at least partially on one or more of:
   (i) a strength of the signal from the personal computing device associated with the user, or
   (ii) a direction from which the signal from the personal computing device associated with the user is received; and
   modifying, by the media player device, one or more characteristics of the streaming of the media content based on the indication of the attention of the user associated with the personal computing device.

2. The method of claim 1, wherein the media content includes one or more of audio content or video content.

3. The method of claim 1, wherein the signal from the personal computing device is a short-range signal.

4. The method of claim 1, wherein determining the indication of the attention of the user to the media player device based on the signal from the personal computing device associated with the user includes:
   determining a distance between the personal computing device and the media player device based on the signal from the personal computing device; and
   determining the indication of the attention of the user to the media player device based on the distance between the personal computing device and the media player device.

5. The method of claim 4, wherein determining the indication of the attention of the user to the media player device based on the distance between the personal computing device and the media player device includes determining whether the distance between the personal computing device and the media player device includes exceeds a threshold distance.

6. The method of claim 1, wherein determining the indication of the attention of the user to the media player device based on the signal from the personal computing device associated with the user includes:
   determining a location of the personal computing device with respect to the media player device based on the signal from the personal computing device; and
   determining the indication of the attention of the user to the media player device based on the location of the personal computing device with respect to the media player device.

7. The method of claim 6, wherein determining the indication of the attention of the user to the media player device based on the location of the personal computing device with respect to the media player device includes determining an extent to which the personal computing device is in front of a display of the media player device, behind the display of the media player device, or adjacent to the display of the media player device.

8. The method of claim 6, wherein determining the indication of the attention of the user to the media player device based on the location of the personal computing device with respect to the media player device includes determining an extent to which the personal computing device is above or below the media player device.

9. The method of claim 6, wherein determining the indication of the attention of the user to the media player device based on the location of the personal computing device with respect to the media player device includes determining whether the personal computing device is in the same room as the media player device.

10. The method of claim 1, wherein determining the indication of the attention of the user to the media player device based on the signal from the personal computing device associated with the user includes:
    determining an orientation of the personal computing device with respect to the media player device based on the signal from the personal computing device; and
    determining the indication of the attention of the user to the media player device based on the orientation of the personal computing device with respect to the media player device.

11. The method of claim 10, wherein determining the indication of the attention of the user to the media player device based on the orientation of the personal computing device with respect to the media player device includes determining an extent to which the head or body of the user is facing the media player device based on the orientation of the personal computing device with respect to the media player device.

12. The method of claim 1, wherein determining the indication of the attention of the user to the media player device based on the signal from the personal computing device associated with the user includes:
    determining an indication of user engagement with one or more applications of the personal computing device;
    determining the indication of the attention of the user to the media player device based on the indication of user engagement with one or more applications of the personal computing device.

13. The method of claim 1, wherein determining the indication of the attention of the user to the media player device based on the signal from the personal computing device associated with the user includes:
    determining an indication of motion of the personal computing device with respect to the media player device based on the signal from the personal computing device; and
    determining the indication of the attention of the user to the media player device based on the indication of the motion motion of the personal computing device with respect to the media player device.

14. The method of claim 1, wherein modifying one or more characteristics of the streaming of the media content based on the indication of the attention of the user associated with the personal computing device includes:
    modifying a quality level of the streaming of the media content based on the indication of the attention of the user associated with the personal computing device.

15. The method of claim 1, wherein modifying one or more characteristics of the streaming of the media content based on the indication of the attention of the user associated with the personal computing device includes:
    switching from a combined audio and video stream to an audio-only stream based on the indication of the attention of the user associated with the personal computing device.

16. The method of claim 1, wherein modifying one or more characteristics of the streaming of the media content based on the indication of the attention of the user associated with the personal computing device includes:
    pausing the streaming of the media content based on the indication of the attention of the user associated with the personal computing device.

17. The method of claim 1, wherein modifying one or more characteristics of the streaming of the media content based on the indication of the attention of the user associated with the personal computing device includes:
    rewinding the streaming of the media content based on the indication of the attention of the user associated with the personal computing device.

18. A media player device, comprising:
    one or more of an audio output or a video output;
    one or more processors; and
    a non-transitory program memory communicatively coupled to the one or more processors and storing executable instructions that, when executed by the one or more processors, cause the processors to:

stream media content via one or more of the audio output or the video output;

receive a signal from a personal computing device associated with a user;

determine an indication of the attention of the user to the media player device based at least partially on one or more of:

(i) a strength of the signal from the personal computing device associated with the user, or (ii) a direction from which the signal from the personal computing device associated with the user is received; and modify one or more characteristics of the streaming of the media content based on the indication of the attention of the user associated with the personal computing device.

19. The media player device of claim 18, further comprising a short-range communication interface, and wherein the signal from the personal computing device is a short-range signal.

20. The media player device of claim 18, wherein the instructions, when executed by the one or more processors, cause the processors to determine the indication of the attention of the user to the media player device based on the signal from the personal computing device associated with the user by:

determining a distance between the personal computing device and the media player device based on the signal from the personal computing device; and determining the indication of the attention of the user to the media player device based on the distance between the personal computing device and the media player device.

* * * * *